United States Patent [19]
Adey et al.

[11] Patent Number: 6,040,074
[45] Date of Patent: Mar. 21, 2000

[54] METAL-AIR CATHODE CAN, AND ELECTROCHEMICAL CELL MADE THEREWITH

[75] Inventors: Robert Adey, South Shields, United Kingdom; Robert Brian Dopp, Marietta, Ga.; John Edward Oltman, Mount Horeb, Wis.

[73] Assignee: Rayovac Corporation, Madison, Wis.

[21] Appl. No.: 08/846,327

[22] Filed: Apr. 30, 1997

Related U.S. Application Data

[63] Continuation-in-part of application No. 08/435,477, May 5, 1995, Pat. No. 5,733,676.

[51] Int. Cl.[7] .................................................. H01M 12/06
[52] U.S. Cl. ............................................. 429/27; 429/82
[58] Field of Search .................................. 429/27, 82, 83

[56] References Cited

U.S. PATENT DOCUMENTS

| | | | |
|---|---|---|---|
| Re. 31,413 | 10/1983 | Jaggard | 429/27 |
| 3,352,769 | 11/1967 | Ruben | 204/143 |
| 3,372,060 | 3/1968 | Platner | 136/86 |
| 3,746,580 | 7/1973 | Aker et al. | 136/86 A |
| 4,041,211 | 8/1977 | Wiacek | 429/36 |
| 4,105,830 | 8/1978 | Kordesch | 429/27 |
| 4,118,544 | 10/1978 | Przybyla et al. | 429/27 |
| 4,189,526 | 2/1980 | Cretzmeyer et al. | 429/13 |
| 4,262,062 | 4/1981 | Zatsky | 429/27 |
| 4,343,869 | 8/1982 | Oltman et al. | 429/27 |
| 4,369,568 | 1/1983 | Dopp | 429/27 |
| 4,404,266 | 9/1983 | Smilanich | 429/27 |
| 4,591,539 | 5/1986 | Oltman et al. | 429/27 |
| 4,617,242 | 10/1986 | Dopp | 429/27 |
| 4,640,874 | 2/1987 | Kelm | 429/27 |
| 4,649,090 | 3/1987 | Oltman et al. | 429/29 |
| 4,687,714 | 8/1987 | Oltman et al. | 429/27 |
| 4,822,698 | 4/1989 | Jackovitz et al. | 429/27 |
| 5,069,986 | 12/1991 | Dworkin et al. | 429/27 |
| 5,093,212 | 3/1992 | Lloyd et al. | 429/27 |
| 5,191,274 | 3/1993 | Lloyd et al. | 320/2 |
| 5,279,905 | 1/1994 | Mansfield, Jr. et al. | 429/27 |
| 5,306,578 | 4/1994 | Ohashi et al. | 429/27 |
| 5,308,711 | 5/1994 | Passaniti et al. | 429/29 |
| 5,328,777 | 7/1994 | Bentz et al. | 429/27 |
| 5,362,577 | 11/1994 | Pedicini | 429/27 |
| 5,451,473 | 9/1995 | Oltman et al. | 429/27 |
| 5,458,988 | 10/1995 | Putt | 429/27 |
| 5,506,067 | 4/1996 | Tinker | 429/27 |

(List continued on next page.)

FOREIGN PATENT DOCUMENTS

| | | | |
|---|---|---|---|
| 2177393 | 4/1995 | Canada | H01M 2/04 |
| 0560579A1 | 9/1993 | European Pat. Off. | |
| 62-202470 | 9/1987 | Japan | |
| 5-47422 | 2/1993 | Japan | |
| 5-217605 | 8/1993 | Japan | |
| 2110464A | 6/1983 | United Kingdom | |

OTHER PUBLICATIONS

Bender, Steven F., et al, "Zinc/Air Cells", *Handbook of Batteries*, New York: McGraw–Hill, Inc., 1995. pp. 13.1–13.5 (Month N/A).

"High–Capacity Zinc–Air Battery Series For Hearing Aids," by Noaka Soma and Yoshinobu Morita published in National Technical Report, vol. 40, No. 4, Aug. 1994, pp. 18–23.

*Primary Examiner*—Stephen Kalafut
*Attorney, Agent, or Firm*—Thomas D. Wilhelm

[57] ABSTRACT

This invention pertains to metal-air electrochemical cells wherein one or more air entry ports is located in the bottom of the cathode can, to provide for entry of oxygen-rich air into the cathode can, where the oxygen participates in the electrochemical reaction whereby the cell produces electrical energy. In this invention, extremely small air ports are provided, along with methods of reliably fabricating such small air ports Generally, the use of an increased number of small air ports distributed over the bottom of the cathode can, opposite the reaction surface of the cathode assembly, wherein the overall open area of the ports is not increased, results in less moisture traversing the air ports, into or out of the cell. Accordingly, moisture loss, or gain, as a function of electrical energy produced, is thereby reduced.

46 Claims, 9 Drawing Sheets

U.S. PATENT DOCUMENTS

| | | | |
|---|---|---|---|
| 5,554,452 | 9/1996 | Delmolino et al. | 429/10 |
| 5,567,538 | 10/1996 | Oltman et al. | 429/27 |
| 5,576,117 | 11/1996 | Morita et al. | 429/162 |
| 5,582,930 | 12/1996 | Oltman et al. | 429/27 |
| 5,587,259 | 12/1996 | Dopp et al. | 429/27 X |
| 5,591,541 | 1/1997 | Oltman | 429/171 |
| 5,658,356 | 8/1997 | Burns | 29/623.2 |
| 5,662,717 | 9/1997 | Burns | 29/623.1 |
| 5,733,676 | 3/1998 | Dopp et al. | 429/27 |
| 5,804,327 | 9/1998 | Oltman | 429/27 |
| 5,945,234 | 8/1999 | Burns | 429/66 |

METAL-AIR CATHODE CAN, AND ELECTROCHEMICAL CELL MADE THEREWITH

This application is a Continuation-in-Part of application Ser. No. 08/435,477 filed May 5, 1995, now U.S. Pat. No. 5,733,676 incorporated herein by reference in its entirety.

FIELD OF THE INVENTION

This invention relates to alkaline electrochemical cells having metallic anodes and air cathodes, commonly known as metal-air cells, and especially to zinc-air cells. More particularly, this invention relates to the structure of the cathode can, namely to the sizes of air ports used on the bottom of the cathode can and methods for fabricating the cathode can to make air ports as herein disclosed. The air ports of the invention have specifically limited open area to provide ingress of air containing cathodic oxygen, while restricting water vapor movement.

BACKGROUND OF THE INVENTION

The growth in use of portable electrically-powered devices has increased the demand for small power sources, and especially metal-air electrochemical cells. Such small cells are usually disc-like or pellet-like in appearance, and may be similar in size to garment buttons, although they can be either smaller or larger. Typical such cells generally have diameters ranging from less than 0.25 inch (6 millimeters) up to about 1.0 inch (25 millimeters), and height ranging from less than 0.15 inch (4 millimeters) up to about 0.60 inch (15 millimeters). The small size and the limited amount of electrochemically reactive material which can be contained in these small metal-air cells make it desirable to direct considerable attention to improving the efficiency and completeness of the power generating electrochemical reactions which occur in such cells.

The basic chemical reactions of such cells are known. Namely, metal-air cells convert atmospheric oxygen to hydroxyl ions in the air cathode. The hydroxyl ions then migrate to the anode, where they cause the metal contained in the anode to oxidize. Usually the active anode material in such cells comprises zinc.

More particularly, the desired reaction in the air cathode of a metal-air cell involves the reduction of oxygen, the consumption of electrons, and the production of hydroxyl ions. The hydroxyl ions migrate through the electrolyte toward the anode, where oxidation of zinc may occur, forming zinc oxide, and liberating electrons.

In most metal-air cells, air enters the cell through an air port which extends through the bottom of the cathode can. The air port may be immediately adjacent the cathode assembly, or may be separated from the cathode assembly by an air chamber or an air diffusion member.

In any of such arrangements, the port is desirably configured and positioned to facilitate movement of air through the port into the cell, and to the cathode assembly. At the cathode assembly, oxygen in the air reacts with water at the cathode assembly as a chemically reactive participant in the electrochemical reaction of the cell, and thereby forms hydroxyl ions.

A second, and undesirable function facilitated by the port in the bottom of the cathode can is related to moisture loss. In normal operation, the reaction surface of the cathode assembly is laden with electrolyte, water being a major constituent of the electrolyte. Accordingly, the water at the reaction surface of the cathode assembly has a vapor pressure, and is subject to evaporation at the reaction surface. To the extent water does evaporate at the reaction surface, moisture content of the cell is reduced, along with a corresponding reduction in efficiency of the cell.

Where moisture loss is excessive, the cell may fail before the electrochemical reaction materials have been chemically used up. Thus, there is a relationship between the amount of incoming oxygen that can be made available to the cell through conventional port configurations to enable cell operation, and the amount of moisture vapor which exits the cell through such port configurations.

When the cell is manufactured, and prior to the cell being placed into use, a tab is placed on the outside surface of the bottom of the can, covering the one or more air ports. By covering the air ports, the tab substantially controls ingress and egress of air and moisture through the air ports, thereby greatly slowing down the primary electrochemical reactions, and limiting moisture loss or addition. Thus, the tab extends the storage life of the cell. When the cell is to be used, the tab is removed, whereby air, including cathodic oxygen, freely moves through the air ports and into the cell in support of operation and use of the cell. At that stage, the cell is also increasingly susceptible to ingress and/or egress of moisture.

It is an object of this invention to provide improved cathode can structure for a metal-air electrochemical cell, the cathode can having one or more air entry ports so structured and configured, both individually and relative to each other, that the port configuration provides an improved relationship between the amount of incoming oxygen that is available to the cathode assembly to fuel the cell, and the amount of moisture lost from the cell by moisture vapor transport out through the ports.

It is another object to provide improved cathode can structure for a metal-air electrochemical cell, wherein the sum of the open area of the ports in combination is reduced while the cell limiting current is maintained at a desirably high level.

It is still another object to provide improved cathode can structure for a metal-air electrochemical cell, the cathode can having a plurality of ports, the port configuration being structured so that, in a metal-air cell made with the cathode can, oxygen is more uniformly distributed over the outer surface of the cathode assembly, while minimizing the combined open area of the ports which extend through the cathode can, and thereby reducing the amount of moisture loss through the ports.

A further object is to provide improved metal-air electrochemical cells having an increase in the ratio of the limiting current of the cell to the combined area of gaseous ingress and egress available through the port configuration.

A still further object is to provide yet smaller air ports in the bottom of the cathode can, and to provide methods of mechanically fabricating such smaller air ports.

SUMMARY OF THE DISCLOSURE

In general, electrochemical cells of the invention are made with metal cathode cans having generally smaller air ports than prior art cathode cans. While in some preferred embodiments, a larger number of air ports are used, the sum of the combined open cross-section areas of the ports in any given cathode can is smaller than the combined open cross-section area of a respective prior art cell of the same size and providing a corresponding limiting current. Thus, the bottom of a respective cathode can of the invention has at least one port extending therethrough, between inner and outer can surfaces. The opening may have an area corresponding to a diameter smaller than the average thickness of the bottom, preferably no greater than 90% of the average thickness of the bottom of the cathode can. However, as can forming technology improves, to enable making the can bottom thinner, the above stated relationship between size of the opening and thickness of the bottom of the can may become less relevant.

In preferred embodiments where presently common current draws are placed on the cell, such as for powering a hearing aid, the cathode can of the invention includes at least two ports, each having an open area corresponding to a diameter smaller than the thickness of the bottom, the ports preferably being substantially evenly spaced with respect to each other.

Gas entering the cell through the port or ports traverses across a reservoir to the reaction surface of the cathode assembly. During such traverse, the gas expands from each port, somewhat as a plume, toward the reaction surface. An outline of each such plume is represented by an imaginary closed figure on the reaction surface, aligned with each respective port. When expanded, and where the ports are of equal size and shape, the imaginary closed figures can touch each other without generally overlapping each other, and thus represent a footprint on the cathode assembly corresponding with the spacing of the ports on the bottom of the cathode can. The number of ports, and the spacing of the ports, are preferably selected and arranged such that the footprint covers at least 80% of the effective reaction area of the reaction surface of the cathode assembly.

In some embodiments, the ratio of the average of the diameters of the ports, to the outside diameter of the cathode is preferably no greater than 0.025/1, preferably no greater than 0.020/1, and more preferably 0.017/1 or less.

In other embodiments, the ports are preferably defined in terms of the open area enclosed thereby. In these embodiments, the ratio of the average of the areas of the ports, to the area of the bottom of the cathode can is no greater than $1.4 \times 10^{-2}/1$, preferably no greater than $1 \times 10^{-3}/1$, and more preferably no greater than $5 \times 10^{-4}/1$. The ratio may be smaller, such as $2 \times 10^{-4}/1$, or $4 \times 10^{-5}/1$. Even smaller ratios are preferred for some embodiments, such as $2 \times 10^{-5}/1$, or $5 \times 10^{-6}/1$. In embodiments employing the smallest range of air ports, the ratio may be in the range of about $1.2 \times 10^{-6}/1$ to about $4 \times 10^{-6}/1$, preferably about $1.2 \times 10^{-6}/1$ to less than $3 \times 10^{-6}/1$, with a highly preferred ratio being about $2.8 \times 10^{-6}/1$.

In general, the ratio of the sum of the open areas of all the air ports on a given metal cathode can to the area of the bottom of the cathode can, as defined by the outside diameter of the cathode can, is no greater than $7.5 \times 10^{-4}/1$, preferably no greater than $5 \times 10^{-4}/1$.

A preferred feature of electrochemical cells made using the invention is that the ratio of the limiting current of the electrochemical cell, in milliamps, to the effective reaction area of the reaction surface in millimeters squared be at least 100/1, preferably at least 125/1, more preferably at least 150/1, and most preferably at least 220/1.

The advantages of the invention become more apparent as the diameter of the port, or ports, is reduced. Accordingly, it is desired that the area of any given port correspond to a diameter of less than 0.010 inch (0.25 millimeter), preferably less than 0.008 inch (0.2 millimeter), more preferably less than 0.0065 inch (0.17 millimeter), still more preferably less than 0.005 inch (0.13 millimeter), and most preferably as little as 0.003 inch (0.08 millimeter), or less. Indeed, using methods of the invention, air ports can be made any size desired, and fabricated to include any degree of reclosure desired, to include full reclosure of the opening.

Further objects are obtained in a metal cathode can for use in a metal-air electrochemical cell. The metal cathode can has an outside diameter of no more than about one inch (25.4 millimeters), and comprises a bottom up to about 0.008 inch (0.20 millimeter) thick, having an inner surface and an outer surface. A side wall extends upwardly from the bottom. At least five ports extend through the bottom, between the inner surface and the outer surface. The ports preferably are substantially evenly spaced with respect to each other. Average area of a respective port preferably corresponds to a diameter no greater than about 90% of the average thickness of the bottom.

With the small sizes of the ports, and the increased number of ports, air can pass into the metal cathode can in sufficient quantity to provide adequate cathodic oxygen to support desired operation of the electrochemical cell, while limiting the passage of moisture into the cell.

In some embodiments, the invention comprehends at least two ports through the bottom, the ratio of the average of the diameters of the ports to the diameter of the cathode being no greater than 0.025/1, preferably no greater than 0.020/1, more preferably no greater than 0.017/1. In other embodiments, the invention comprehends at least three ports through the bottom, each port extending from the outer surface to the inner surface, and across the thickness therebetween.

In some embodiments, there may be four air ports, five air ports, six air ports, or even more. The number of ports is preferably greater than three where the overall diameter of the cathode can is greater than e.g. at least 0.30 inch (8 millimeters), in some embodiments at least 0.4 inch (10 millimeters).

It is preferred that the average diameter of the ports be no more than about 0.0067 inch (0.17 millimeter), preferably no more than about 0.005 inch (0.13 millimeter).

A preferred electrochemical metal-air cell of the invention has limiting current, at initial start-up of such cell, of at least 7.5 milliamps, preferably at least 8 milliamps. In such cells, the ratio of the limiting current in milliamps to the sum of the areas of the ports in millimeters squared is at least 100/1, preferably at least 110/1, more preferably at least 120/1, still more preferably at least 130/1, yet more preferably at least 150/1, and most preferably at least 170/1.

In cells of the invention having at least one port, the area of the port corresponds to a diameter of no more than 0.0067 inch (0.17 millimeter), preferably no more than 0.005 inch (0.13 millimeter), more preferably no more than 0.003 inch (0.13 millimeter).

In cells of the invention having at least two ports, the average of the areas of the ports corresponds to a diameter of no more than 0.009 inch (0.23 millimeter), preferably no more than 0.007 inch (0.18 millimeter), more preferably no more than 0.005 inch (0.13 millimeter), most preferably no more than 0.003 inch (0.13 millimeter), in some cases less than 0.002 inch (0.051 millimeter), or less than 0.001 inch (0.025 millimeter).

In electrochemical cells of the invention having at least three ports, the average of the areas of the ports corresponds to a diameter of no more than 0.015 inch (0.38 millimeter), preferably no more than 0.010 inch (0.25 millimeter), more preferably no more than 0.007 inch (0.18 millimeter), still more preferably no more than 0.005 inch (0.13 millimeter), most preferably no more than 0.003 inch (0.08 millimeter), in some cases less than 0.001 inch (0.025 millimeter).

Thus, as the invention is applied to larger cells, typically a larger number of ports is used. In the larger size cells, some benefits of the invention are obtained with increasingly larger sizes of the air ports. In general, though, the benefits of the invention are increased as air port size decreases. Moreover, in general, for a given cell size, increasing benefits of the invention are obtained as the number of air ports is increased in combination with an overall decrease in the total open area of all the air ports.

The invention further comprehends a method of making the small air ports in cathode cans of the invention. First, a conventional hole is created in the bottom of the cathode can by any desired conventional method. The hole so made is larger than the desired size, for example about 0.010 inch (0.25 millimeter) to about 0.020 inch (0.51 millimeter) diameter.

In the second step, the metal around the port is worked, such as by peening, causing the metal to flow, thereby to reduce the size of the hole. In preferred embodiments, the metal about the hole is restrained during the peening step, such that the peening directs the metal preferentially inwardly toward the hole. Using the restrained peening process, the size of the hole can be reduced to make any size port greater than complete closure of the hole. The restrained peening step can even be used to completely reclose the so formed hole. Thus, the restrained peening step is effective to completely close the so-formed hole/port, or to provide any size port from the minimum size port that can be detected, up to the size of the hole initially created in the conventional hole-forming step.

Thus, ports having sizes corresponding to 0.001 inch (0.025 millimeter) or less diameter are readily made, for example sizes corresponding to 0.00075 inch (0.019 millimeter) diameter. Smaller port sizes, down to corresponding to 0.0005 inch (0.013 millimeter), even 0.00025 inch (0.006 millimeter) diameter, and less, are contemplated as possible using methods of the invention.

Figure 1:
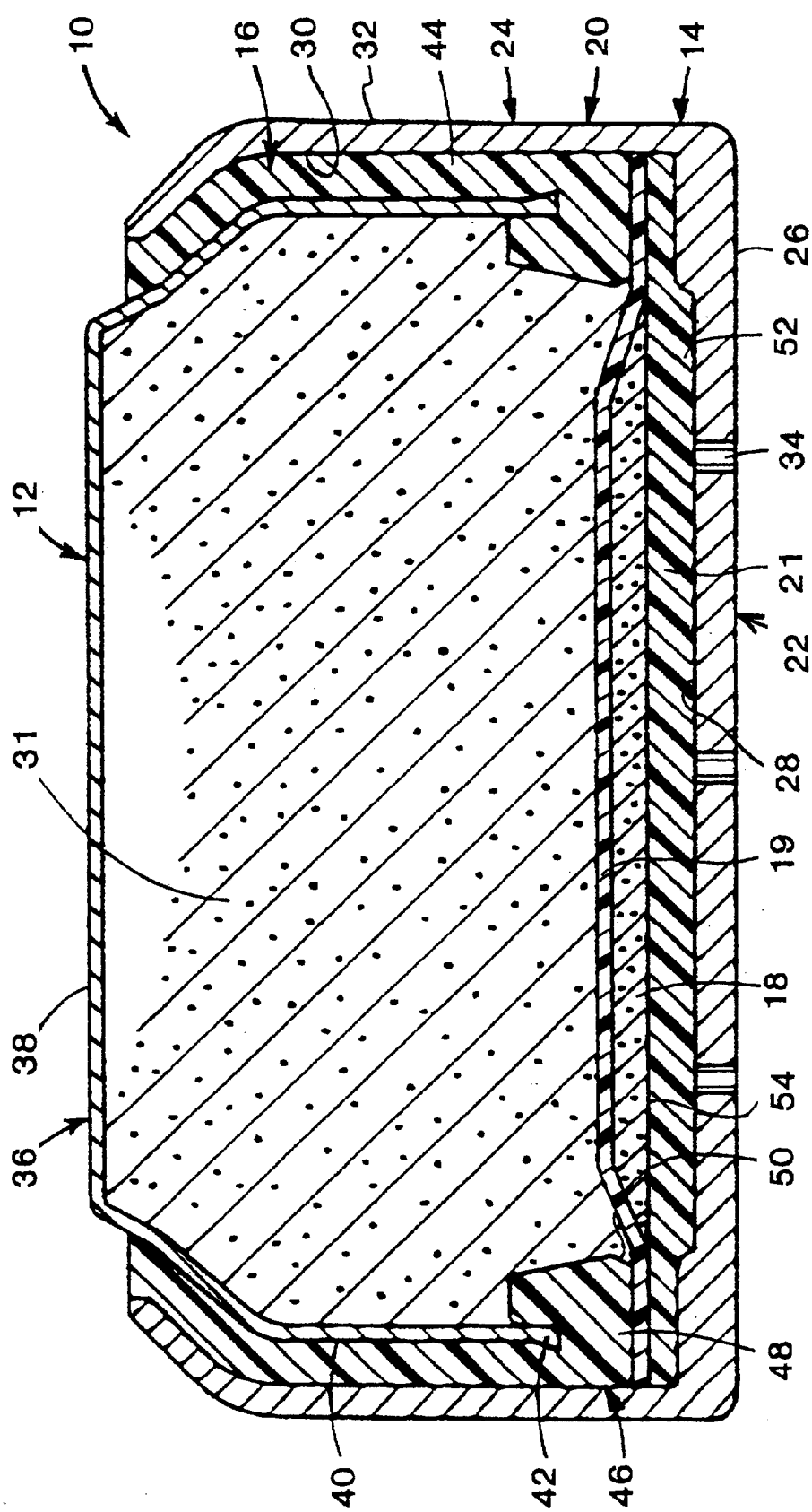
FIG. 1 shows a cross-section of a typical metal-air electrochemical cell of the invention.

The invention is not limited in its application to the details of construction and the arrangement of the components set forth in the following description or illustrated in the drawings. The invention is capable of other embodiments or of being practiced or carried out in various ways. Also, it is to be understood that the terminology and phraseology employed herein is for purpose of description and illustration and should not be regarded as limiting. Like reference numerals are used to indicate like components.

DETAILED DESCRIPTION OF THE ILLUSTRATED EMBODIMENTS

Referring now by characters of reference to the drawings, FIG. 1 generally represents a cross-section of a metal-air cell 10, preferably a zinc-air cell, of the present invention. The negative electrode 12, also referred to as the anode 12, is electrically insulated from the positive electrode, also referred to as cathode 14, by a seal 16, typically made from nylon or other polymeric material.

Cathode 14 includes a cathode assembly 18, contained within cathode can 20. Cathode can 20 has a bottom 22, and circumferential upstanding side wall 24 extending upwardly from the bottom. Cathode assembly 18 includes a current collector and catalytic carbon or similar material. Barrier layer 19, typically polypropylene, spaces the reactive anode material 31 from the cathode assembly. Air diffusion layer 21, typically polytetrafluoroethylene (PTFE), is disposed on the surface of the cathode assembly adjacent the inner surface 28 of bottom 22 of the cathode can, and generally fills air reservoir 52.

The inner and outer surfaces 30, 32 respectively of side wall 24 of the cathode can extend about the circumference of the cathode can, defining the side wall between them.

Bottom 22 of the cathode can typically has an outer surface 26 which, along with inner surface 28, defines a thickness "T" therebetween.

Air ports 34 extend through bottom 22 of the can, between outer surface 26 and inner surface 28.

The anode includes anode can 36, which includes a top wall 38, and side wall 40 depending downwardly from top wall 38, to a foot 42 at the bottom of side wall 40.

Side wall 44 of seal 16 extends about the circumference of cell 10, between the outer surface of side wall 40 of the anode can and inner surface 30 of side wall 24 of the cathode can, and downwardly to a lower end 46 of the seal, near inner surface 28 of bottom 22 of the cathode can.

At the lower end 46 of seal 16, a base 48 of the seal extends inwardly from inner surface 30 of side wall 24 of the cathode can, and under foot 42 of side wall 40 of the anode can. Thus, base 48 of seal 16 is interposed between foot 42 of side wall 40 of the anode can and inner surface 28 of bottom 22 of the cathode can. Base 48 extends about the entire inner circumference of cell 10, adjacent cathode assembly 18, defining the active area of the cathode assembly inside the inner edge 50 of base 48.

While base 48 of seal 16 provides a desirable sealing function, base 48 generally blocks off, from participation in the electrochemical reaction, that area of the cathode assembly 18 which is held between base 48 of the seal and inner surface 28 of bottom 22 of the cathode can. Accordingly, only that portion of cathode assembly 18 which is disposed inwardly of inner edge 50 of base 48 is available to participate in the electrochemical reaction of the cell, and is referred to herein as the cathode reaction surface 54. The cathode reaction surface, of course, has a mathematically defined area which is referred to herein as the reaction area.

It is known that the reaction surface of the cathode assembly must have access to oxygen from the air surrounding the cell in order for the metal-air cell to operate as intended. Accordingly, all metal-air cells have at least one air entry port 34 which allows air to enter the cell. Correspondingly, since the air is about 20% oxygen, and since oxygen is the only major component of the air consumed by the cell, the air inside the cell, in air reservoir 52 is continuously replenished by oxygen-laden air from outside the cell whenever the cell is in operation. Thus, the air entry port can function as both an entry port for oxygen-laden air and an exit port for oxygen-depleted air.

As oxygen is consumed at the reaction surface of cathode assembly 18, an oxygen partial pressure gradient is set up in air reservoir 52. The partial pressure of oxygen is thus relatively lower adjacent the reaction surface, and is relatively higher further away from the reaction surface. This partial pressure gradient sets up a gradient-driven diffusion of oxygen toward the reaction surface, and corresponding ingress of at least oxygen at port 34.

Figure 4:
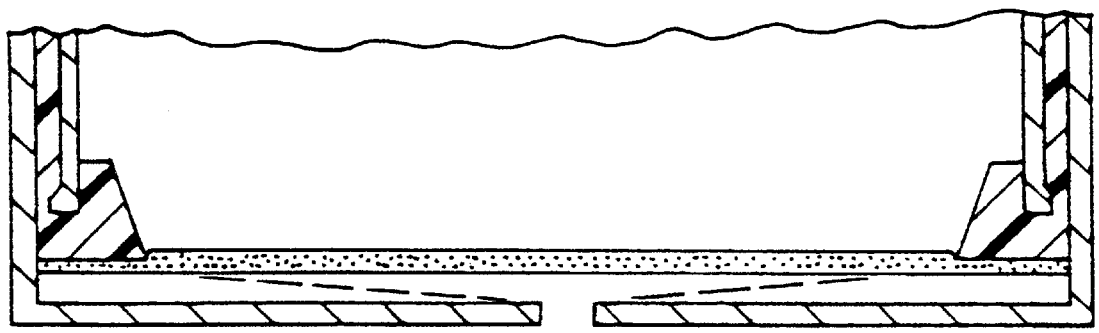
FIG. 4 is a partial section view of a prior art cell outlining a typical air plume in the air reservoir, expanded from a single central air port.

As oxygen enters the port, the oxygen spreads out over substantially the entire reaction surface 54, supplying necessary cathodic oxygen to the reaction surface. The spreading of the oxygen over the reaction surface is illustrated in prior art FIG. 4 as a pair of divergent dashed lines describing a wide-angle cone, which may resemble, in three dimensional view, a plume extending from an orifice. Note in FIG. 4, the relatively long distance between the port and the outer edges of the cone.

Figure 2:
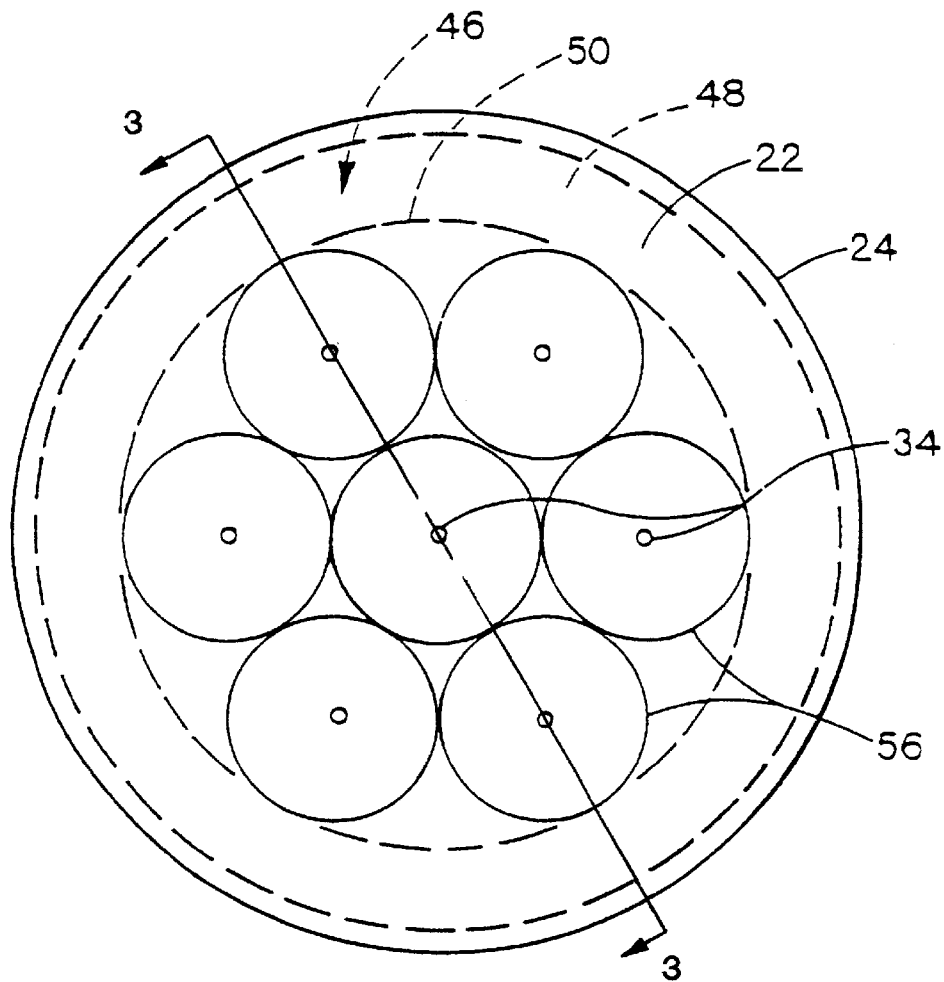
FIG. 2 is a bottom view of the cell of FIG. 1, showing a typical footprint on the cathode assembly.
Figure 3:
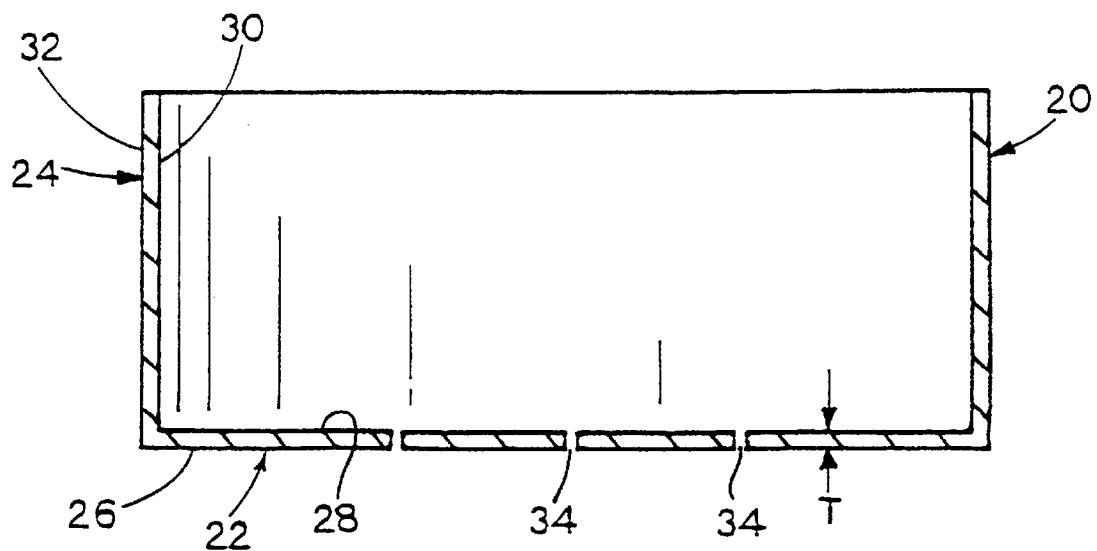
FIG. 3 is a cross-section of the cathode can of FIG. 2, taken at 3—3 of FIG. 2.
Figure 5:
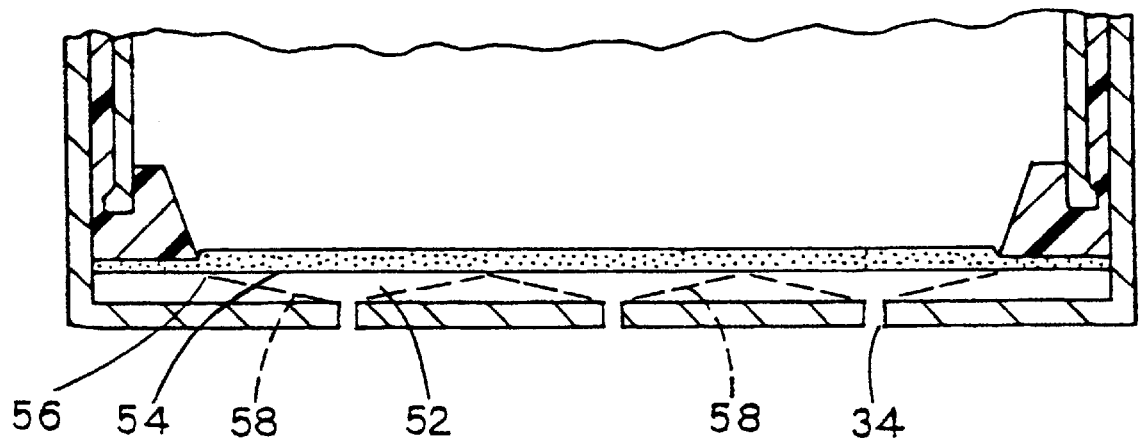
FIG. 5 is a partial section view of a cell of the invention showing typical multiple air plumes in the air reservoir, expanded from respective multiple air ports.

FIGS. 2 and 5, in combination, illustrate the relatively shorter distances between the multiple ports 34 and the outer edges of the respective plumes in a preferred cathode can of the invention. While multiple ports are not essential to the invention in some embodiments, the advantages attendant the invention are usually enhanced by using multiple ports. Each of the 7 larger circles in the central portion of FIG. 2 represents the outer edge of the imaginary enclosed area 56 of a corresponding plume 58 at the intersection of the plume with the reaction surface of the cathode assembly. The circles are, of course, visually imaginary and thus are not visible on reaction surface 54. They are instructive, however, regarding the ingress and distribution of oxygen into and out of air reservoir 52.

The arrangement of ports 34 relative to each other is a simple study of close packing of circles inside a confining perimeter, to make a closely packed arrangement e.g. a footprint on the reaction surface. The oxygen, of course, diffuses throughout the air reservoir, to reach all areas of the entire reaction surface. However, the diffusion is believed to be most efficient within the imaginary circular outlines of plumes 58 as projected from the respective ports 34.

PTFE air diffusion layer 21 is quite porous, and thus compatible with diffusion of oxygen through air reservoir 52. Diffusion layer 21 is generally in surface-to-surface contact with inner surface 28 of the bottom of the cathode can, filling air reservoir 52, which is disposed between inner surface 28 of the cathode can and reaction surface 54.

In addition to serving as a passageway for conduct of oxygen to the reaction surface, air reservoir 52, with cooperation of air diffusion layer 21, serves as an air accumulation chamber, holding enough oxygen "fuel" to provide for a temporary increase in the current-producing capability of the cell, sometimes also referred to as the "pulse" capability of the cell. Air reservoir 52 also serves as a damping chamber to damp, namely to reduce, any variation in the rate at which oxygen enters the air reservoir.

Both positive and negative aspects attend exposing the reaction surface of the cathode assembly to ambient air. First, a positive aspect of exposing the reaction surface to ambient air is that such exposure is critical to the desired operation of the cell, in that the air provides the reacting cathodic oxygen which is required for normal and intended operation of the cell. Second, and a negative aspect of exposing the reaction surface to ambient air, is that the moisture in the electrolyte at the reaction surface can evaporate from the reaction surface, resulting in moisture loss to the cell. Third, in high humidity conditions, excess moisture can collect on the reaction surface, correspondingly, and undesirably, diluting the composition of the electrolyte at the reaction surface.

Prior to this invention, there was no known method for predictably affecting the balance of these concurrent events to thereby maintain or improve performance of the cell while reducing transport of water vapor into or out of the cell through the air ports.

It is known that, for oxygen to react at the reaction surface of the cathode assembly, the reaction surface must be wetted by the cell electrolyte. The cell electrolyte is typically a combination of potassium hydroxide, water, and other additives well known in the art. In accord with such an electrolyte, the water exerts a partial vapor pressure based on the amount of water in the electrolyte, and on interactions between the water and the other components of the electrolyte.

In a typical such electrolyte based on potassium hydroxide, the partial vapor pressure of the water in the electrolyte equates to a relative humidity of more or less 58%. Thus, in such a cell, a steady state condition of 58% relative humidity in air reservoir 52 would result in no net evaporation of water from the reaction surface. Thus, 58% relative humidity can represent an ideal operating environment for the cell. To the extent the relative humidity outside the cell is less than 58%, moisture tends to evaporate from the reaction surface, and migrate out of the cell, such that the cell tends to dry out. If enough moisture is lost in this manner, the cell may cease to operate before the reaction materials are all used up chemically, because of inadequate moisture in the cell to support continuing normal operational chemical reactions in the cell.

To the extent the relative humidity outside the cell is greater than 58%, excess moisture from the incoming air tends to accumulate on the reaction surface, and correspondingly to migrate into the cell. This additional moisture in the cell has the affect of occupying space inside the cell, and diluting the concentration of the potassium hydroxide, whereby the excess moisture may cause the cell to operate inefficiently, or to cease all proper operation prematurely. Thus, proper operation of the cell may be negatively affected by either too little water in the cell, or too much water in the cell.

It is well known that relative humidity in ambient air varies significantly from place to place. It is also well known that ambient relative humidity at any given place can change rapidly. Thus, electrochemical cells such as metal-air cells addressed by the invention, are exposed to an often-changing condition of ambient relative humidity. This, correspondingly, subjects the cell to an often-changing relative humidity gradient between air reservoir 52 and the ambient outside air. Movement of moisture into, or out of, air reservoir 52 depends on Knudsen Diffusion which, being dependent on Brownian movement, is proportional to the total of the cross-sectional areas of the air ports. Movement of oxygen into the cell, on the other hand, is also driven by Fick's law of diffusion which addresses the depleted oxygen partial pressure at the reaction surface.

To the extent the open cross-sectional area of the ports is large, relative humidity equilibrium between ambient air and the air reservoir is reached rather quickly, such that 95% of an initial relative humidity differential may be eliminated in a few days, whereby the relative humidity inside the cell approaches ambient relative humidity; never the reverse. To the extent the cross-sectional area of air ports 34 is less, it takes longer to reach relative humidity equilibrium. The longer time for reaching relative humidity equilibrium, whereby the relative humidity inside the cell is maintained generally closer to ideal conditions for a relatively longer period of time, results in improved cell performance over that longer period of time.

In general, the rate at which air can enter the air reservoir through the port, and the rate at which moisture vapor and oxygen-depleted air can exit the air reservoir through the port, depends on size or sizes, on the configuration or configurations, and on the arrangement of the port or ports. Known cells have one or more such ports. However, the art is deficient in teaching the relationship between ingress of oxygen laden air, egress of oxygen depleted air, and respective ingress and egress of moisture vapor, through the port or ports into and out of air reservoir 52.

In general, a port 34 extends through the bottom 22 of the cathode can, providing a route of access for air to travel from outside the cathode can to air reservoir 52 on the inside of the cathode can. Preferably, but not necessarily, port 34 is generally round in shape, such that it has a diameter extending thereacross. Thus, each port defines an included cross-sectional area, such that one can measure the diameter of each port, calculate the area of the opening, e.g. at outer surface 26 of the bottom of cathode can 20, for each port, and thus arrive at a composite sum of the areas represented by all of ports 34. Where a given port is not round, and is for example elliptical, or otherwise shaped, appropriate accommodations are made in calculating the area of the opening represented by such port and a respective effective diameter of a round port having the same area of the opening.

By studying phenomena related to gaseous transport of oxygen and air, gaseous transport of moisture vapor, and the properties of corresponding metal-air cells, the inventors herein have discovered that, for a given cell size and structure, the amount of moisture lost from the cell, relative to the amount of electricity produced, can be reduced by using a larger number of spaced, relatively smaller holes in place of the conventionally used larger holes. In addition, the inventors herein have surprisingly discovered that, considering known electrical performance characteristics for a given cell, and considering a conventional port configuration, cell electrical performance characteristics can be maintained while the weight loss due to moisture evaporation is reduced, by increasing the number of ports while reducing the composite sum of the area represented by all of the respective ports.

EXAMPLE 1

Two cells were constructed according to size PR44 of the International Electrochemical Commission (IEC). The first cell represented a conventional cell of the prior art, and was constructed having three ports 34, each 0.018 inch (0.46 millimeter) diameter, for a total area of 0.5 millimeter squared represented by all the ports. A second, otherwise identical, cell of the invention was constructed having 6 ports 34, each 0.010 inch (0.25 millimeter) diameter, for a 40% smaller total area of 0.3 millimeter squared represented by all the ports. The limiting current of the first cell, with the 3 larger ports, was 39.0 milliamps; that of the second cell, with the 6 smaller ports, was 38.2 milliamps. Standard deviation was 3 milliamps, whereby the limiting currents of the two cells were statistically indistinguishable from each other.

Both cells were subjected to identical conditions of 2% relative humidity for 14 days. Weight loss of the first cell was 26.8 milligrams, while that of the second cell was only 23.8 milligrams. Thus, by dividing up the port area into 6 ports instead of 3 ports, and correspondingly reducing the overall total area represented by the ports, the current capability of the cell was maintained while the moisture loss was reduced by 11%. Thus, EXAMPLE 1 represents the novel concept of using the invention to maintain limiting current at a constant value while reducing moisture loss.

Figure 6:
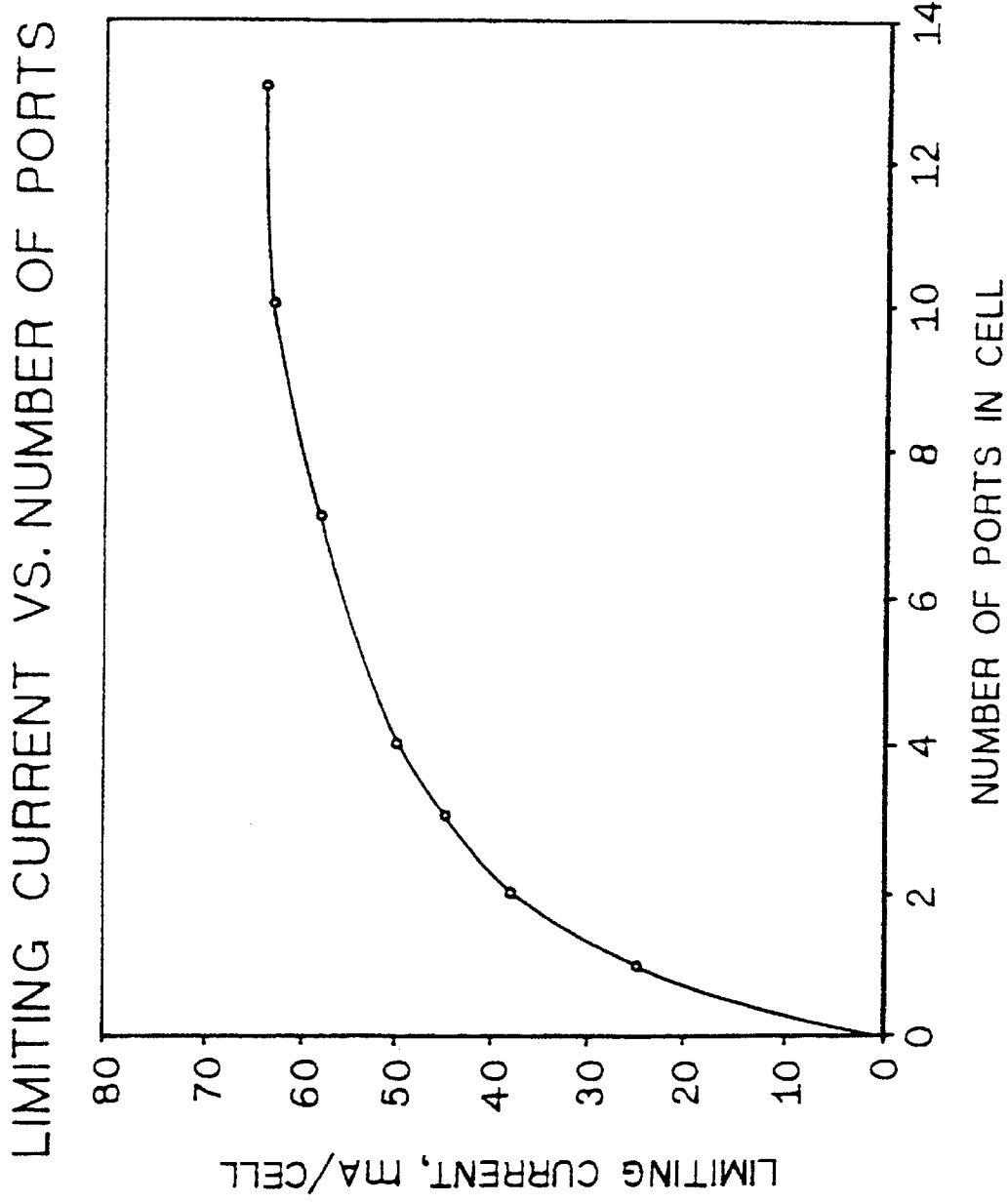
FIG. 6 is a graph showing the relationship between limiting current of a metal-air cell and the number of air entry ports in the bottom of the cathode can, while holding constant the combined area of all the ports.

FIG. 6, on the other hand, illustrates the novel concept of using the invention to maintain moisture loss at a constant value while increasing the limiting current. Thus, FIG. 6 shows in general the relationship between the number of ports and limiting current of the cell, while holding constant the sum of the areas of all the ports in the cell. Maintaining constant values for the areas of all the ports maintains constant the moisture loss. As seen in FIG. 6, as the number of ports is increased, while maintaining constant the total area represented by the ports, the limiting current of the cell rises, from a low of about 24 milliamps with a single port, to a high of about 60 milliamps with 13 ports.

Figure 7:
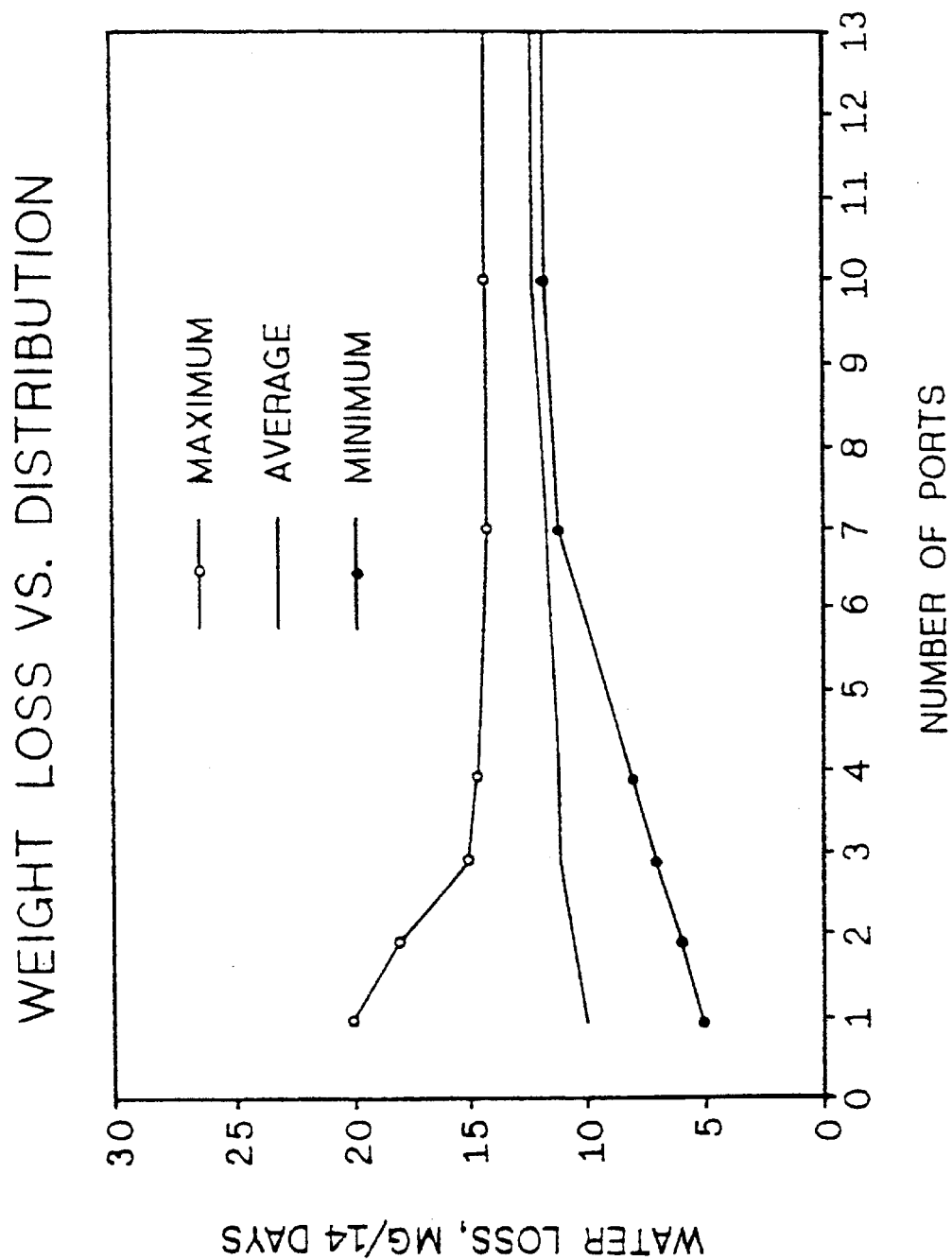
FIG. 7 is a graph showing weight loss of the cells referred to in FIG. 6.

FIG. 7 shows corresponding representation of the weight loss of the cells represented in FIG. 6, in the 14 day weight loss test. FIG. 7 shows that weight loss remained relatively constant while FIG. 6 shows that limiting current for the cells was increased over 100%, from 24 milliamps to 60 milliamps, by distributing the air port open area over a greater number of evenly-distributed air ports.

The affect illustrated in FIGS. 6 and 7 represents an operating environment wherein the overall open area provided by the ports is sufficiently small that the limitation on the electrochemical reaction rate, and thus on cell electrical output, is controlled by the rate at which oxygen can enter the cell. Namely, in such cells, the potential reaction rate capability at reaction surface 54 is generally greater than the actual reaction rate, and is controlled by a controlled throttling affect at the air port or ports. Namely, the air port or ports are so small that oxygen is supplied through the port or ports at a rate slower than that required for the reaction rate at reaction surface 54 to achieve its maximum potential. Thus, the reaction rate at reaction surface 54 is generally oxygen-limited, whereby the oxygen content of the gas at reaction surface 54 generally represents an oxygen deficient condition, which may also be described as an oxygen-lean condition.

The cells used to generate the data represented in FIGS. 6 and 7 were zinc air cells, such as those illustrated in FIG. 1. Outside diameter of each cell was 0.610 inch (15.5 millimeter). The diameter of the reaction surface of the cathode assembly was 0.50 inch (13 millimeter). The corresponding area of the reaction surface was 127 millimeters squared. Total area of the ports was, in all cases, 0.0593 millimeter squared. Cells were made having from 1 port to 13 ports. All ports in a given cell were the same size. But the total area for all the ports in any one cell was the same 0.0593 millimeter squared. Thus, as the number of ports was increased, the sizes of the corresponding ports were smaller. The ports were distributed over the surfaces of the bottoms of the respective cathode cans, evenly about the area described on each can inside the inner edge 50 of base 48 of the respective seal 16.

The number of ports, and the effective diameters of the respective ports represented in FIGS. 6 and 7, are shown in the following Table 1.

TABLE 1

| Number of Ports | Diameter Inches (Millimeters) |
|---|---|
| 1 | .0108 (0.27) |
| 2 | .0076 (0.19) |
| 3 | .0062 (0.16) |
| 4 | .0054 (0.14) |
| 7 | .0041 (0.10) |
| 10 | .0034 (0.09) |
| 13 | .0030 (0.08) |

Thus, in a cell of Table 1 having 13 ports, each 0.003 inch (0.08 mm) effective diameter, the ratio of port open area to reaction surface area was less than $4.5 \times 10^{-4}/1$. Ratio of port open area to the area of the cathode can was $1.8 \times 10^{-4}/1$.

FIGS. 6 and 7 illustrate the principle that distributing the area of the opening provided by the ports, over an increasing number of ports, results in an increased capacity, measurable at least in terms of the limiting current of the cell. FIG. 7 illustrates the general principle that the moisture loss is not correspondingly increased. Rather, moisture loss remains relatively constant.

Figure 8:
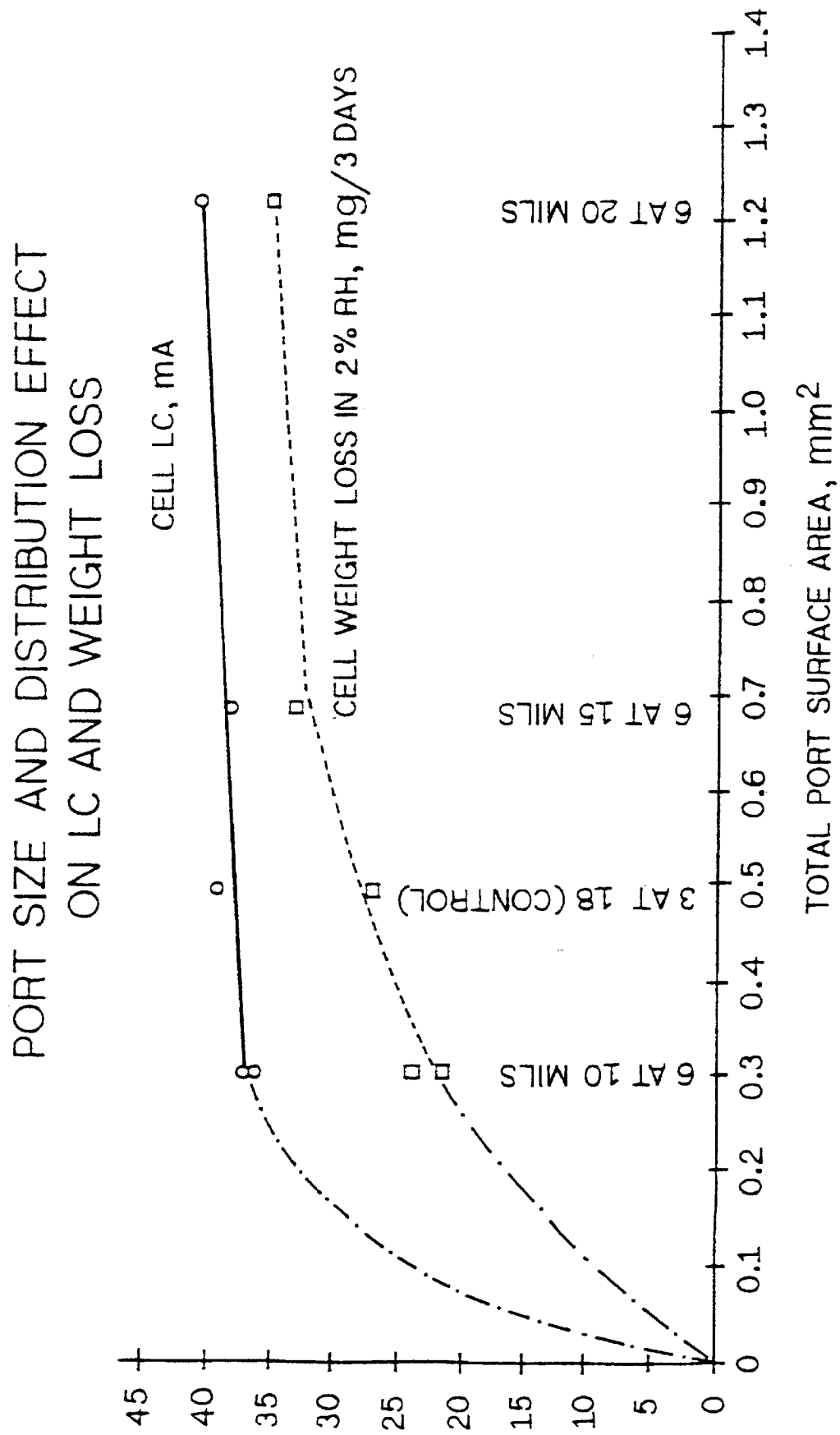
FIG. 8 is a graph illustrating both the limiting current and the cell weight loss as a function of the total open surface area of the ports, and related to the number of ports.

FIG. 8 further illustrates the negative affect of making the ports 34 larger than necessary, respectively the benefit of making the air ports smaller. The cells used were size PR44, according to standards of the IEC. A preferred cell of the invention having 6 ports, each 0.010 inch (0.25 millimeter) diameter, is represented in FIG. 8 as having total area of its ports of 0.3 millimeter squared. Two other data points are shown, at approximately 0.7 and 1.2 millimeter squared total port area, illustrating cells not of the invention and having the same number of ports (6), but wherein the ports are larger at 0.015 inch (0.38 millimeter) and 0.020 inch (0.51 millimeter) diameter. A standard cell, not of the invention, having 3 ports, 0.018 inch (0.46 millimeter) diameter is also shown as a control at approximately area 0.5 millimeter squared.

FIG. 8 illustrates at least three points. First, FIG. 8 illustrates that the limiting current of the cell can be maintained while reducing the combined area of the ports, by increasing the number of ports, and while at the same time reducing moisture loss. Second, FIG. 8 shows that maintaining the number of ports, and increasing the size of the ports does not necessarily result in an increase in limiting current. Third, FIG. 8 illustrates the converging relationship between limiting current and moisture loss as the total surface area of the ports is increased, and the corresponding diverging relationship between limiting current and moisture loss as the total surface area of the ports is decreased.

Note in FIG. 8 that the combination dashed/dotted lines representing total port surface area less than 0.3 millimeter squared show only hypothetical representations linking the actual data at 0.3 millimeter squared port area to the fact that the limiting current and the weight loss due to evaporation both necessarily approach zero as total port surface area approaches zero.

Tables 2, 3, and 4, following, show data for cells of the invention which are Examples 2, 12, and 24, compared to conventionally known cells, not of the invention, namely Examples 3c–11c, 13c–23c, and 25c–32c. Each of Tables 2–4 represents a separate cell size. Each of the examples of conventional cells, in each table, represents a different manufacturer of cells commercially available, the samples being secured generally within 18 months of submission of the parent application hereof. Descriptions for abbreviations in all three tables are given at the end of Table 4.

TABLE 2

| Ex. No. | No. Ports | Port Dia. Inch (mm) | Port Area mm² | LC mA | LC/A | Dp/Dc | Ap/Ac |
|---|---|---|---|---|---|---|---|
| 2 | 6 | .0097 (.25) | .288 | 37.7 | 131 | 21.5 | .068 |
| 3c | 3 | .0184 (.47) | .513 | 32.0 | 62.4 | 40.5 | .244 |
| 4c | 4 | .0196 (.50) | .781 | 41.1 | 52.7 | 43.3 | .278 |
| 5c | 2 | .0158 (.40) | .251 | 24.6 | 97.9 | 34.8 | .179 |
| 6c | 2 | .0199 (.51) | .399 | 23.7 | 59.4 | 43.8 | .285 |
| 7c | 3 | .0230 (.58) | .802 | 34.1 | 42.5 | 50.7 | .381 |
| 8c | 2 | .0175 (.44) | .309 | 19.2 | 62.2 | 38.5 | .220 |
| 9c | 2 | .0170 (.43) | .293 | 12.0 | 41.0 | 37.5 | .209 |
| 10c | 2 | .0147 (.37) | .218 | 15.7 | 72.2 | 32.3 | .155 |
| 11c | 2 | .0169 (.43) | .289 | 13.8 | 47.7 | 37.3 | .206 |

Size = PR44.
Active Area, A = 701 mm².
Cell OD = .453 inch (11.5 millimeters)

TABLE 3

| Ex. No. | No. Ports | Port Dia. Inch (mm) | Port Area mm² | LC mA | LC/A | Dp/Dc | Ap/Ac |
|---|---|---|---|---|---|---|---|
| 12 | 4 | .0050 (.13) | .051 | 9.0 | 177 | 16.4 | .044 |
| 13c | 2 | .0186 (.47) | .351 | 15.0 | 42.8 | 61.0 | .607 |
| 14c | 2 | .0181 (.46) | .332 | 13.8 | 41.6 | 59.3 | .574 |
| 15c | 2 | .0173 (.44) | .303 | 16.5 | 54.4 | 56.7 | .525 |
| 16c | 2 | .0176 (.45) | .314 | 16.3 | 51.9 | 57.7 | .543 |
| 17c | 1 | .0178 (.45) | .161 | 6.0 | 37.4 | 58.4 | .556 |
| 18c | 2 | .0196 (.50) | .389 | 13.9 | 35.7 | 64.3 | .674 |
| 19c | 1 | .0185 (.47) | .173 | 9.7 | 55.9 | 60.7 | .600 |
| 20c | 1 | .0187 (.47) | .177 | 10.4 | 58.7 | 61.3 | .613 |
| 21c | 1 | .0158 (.40) | .126 | 7.5 | 59.3 | 51.8 | .438 |
| 22c | 1 | .0187 (.47) | .177 | 7.4 | 41.8 | 61.3 | .613 |
| 23c | 1 | .0131 (.33) | .087 | 6.0 | 69.0 | 43.0 | .301 |

Size = PR48.
Active Area A = 289 mm².
Cell OD = .305 inch (7.7 millimeters)

TABLE 4

| Ex. No. | No. Ports | Port Dia. Inch (mm) | Port Area mm² | LC mA | LC/A | Dp/Dc | Ap/Ac |
|---|---|---|---|---|---|---|---|
| 24 | 3 | .0050 (.13) | .038 | 9.8 | 257 | 16.4 | .044 |
| 25c | 1 | .0106 (.27) | .057 | 10.6 | 151 | 34.9 | .198 |
| 26c | 2 | .0101 (.26) | .103 | 8.6 | 83.2 | 33.2 | .179 |
| 27c | 1 | .0208 (.53) | .219 | 12.1 | 55.2 | 68.4 | .761 |
| 28c | 1 | .0193 (.49) | .189 | 12.6 | 66.8 | 63.5 | .655 |
| 29c | 1 | .0178 (.45) | .161 | 6.9 | 43.0 | 58.6 | .557 |
| 30c | 1 | .0083 (.21) | .035 | 7.0 | 200 | 27.3 | .121 |

TABLE 4-continued

| Ex. No. | No. Ports | Port Dia. Inch (mm) | Port Area mm² | LC mA | LC/A | Dp/Dc | Ap/Ac |
|---|---|---|---|---|---|---|---|
| 31c | 1 | .0172 (.44) | .150 | 6.4 | 42.7 | 56.6 | .521 |
| 32c | 1 | .0176 (.45) | .157 | 7.0 | 44.6 | 57.9 | .545 |

Size = PR41.
Active Area A = 288 mm².
Cell OD = .304 inch (7.7 millimeters)
LC = Limiting Current.
Dp = Diameter of the ports.
Dc = Outside Diameter of the cell, measured on the cathode can.
Ap = Area of one port.
Ac = Area of the cathode can, based on Dc.

Tables 2–4 demonstrate that the cells of the invention are superior to conventional cells, in terms of the ratio of the limiting current to total area of the ports. Within each cell size, the cells of the invention have the smallest ratio of effective diameter of each port to diameter of the cell. They also have the smallest ratio of area of one port to area of the bottom of the cell. By limiting the relative diameters of the ports, and thus the relative areas of the ports, the moisture loss is correspondingly limited. In all except Table 4, the cells of the invention have the smallest total area of all the ports in a single cell. See Comparative Example 30c for a cell which has a comparable total area of 0.035 mm² with one port, compared with the cell of the invention (Ex.24) which has an area of 0.038 mm² but wherein the cell of the invention, with 3 ports, has a limiting current 28% greater than the conventional cell of Comparative Example 30c. Thus, the comparison of Example 24 with Comparative Example 30c further illustrates that distributing a given port area over a multiplicity of ports can result in an increase in limiting current.

Examples 2, 12, and 24 suggest that the preferred port size depends in part on the absolute size of the imaginary closed area 56 represented by the intersection of the plume 58 with the reaction surface 54. Assuming each port supports an equal proportion of the reaction surface (Active Area), each port in Example 2 supports 0.701/6=117 mm² of the reaction surface while each port in Examples 12 and 24 supports 72 mm² and 96 mm² respectively. Thus, in general, the smaller the area of the reaction surface to be supported by each port, the smaller the port size can be.

Following the empirical data of e.g. FIG. 6 to its logical conclusion, the ideal port configuration comprises an infinitely large number of ports evenly distributed on the bottom 22, adjacent reaction surface 54, each port being infinitesimally small in size.

However, from a practical standpoint, the actual number of ports will generally be finite, and will be governed at least in part by the incremental increase in cell productivity to be achieved by adding one more port. Again referring to FIG. 6, it is clear that the incremental increase in limiting current that results from an incremental increase in the number of ports follows a pattern of diminishing returns as the number of ports is increased. Thus, for the cell represented in FIG. 6, no substantial benefit would be obtained from using more than about 10 ports, and even less may be preferred when the incremental cost of making more and smaller ports is considered.

The specific number of ports, and the specific size of the ports, will of course, depend on the size of the cell (reaction surface) and the performance characteristics demanded of the cell. However, for substantially every standard size metal-air cell, the ratio of limiting current to moisture loss can be increased by distributing the port area over at least two ports, and correspondingly reducing the total port area.

Port size has been discussed herein with respect to diameter, implying a circular port opening, which is preferred. However, any shape opening can be used, such as square, elliptical, irregular, etc. While some modest adaptation of the invention would be suggested by different port shapes, the same principles apply to such divergent shapes.

In general, ports in the cathode cans, and corresponding cells, of the invention range in size from anything greater than zero up to about 0.017 inch (0.43 millimeter). However, any reduction in port area from a reference port size represented by conventionally used port configurations, when coupled with dividing that area over a greater number of ports, can result in increased limiting current while maintaining constant the moisture loss. Correspondingly, moisture loss can be reduced by dividing the port area over a greater number of ports, and reducing the total port area enough that the limiting current is maintained constant. The net result is less total port area, which results in less moisture loss.

Accordingly, if only one port is used, benefit is obtained to the extent port diameter is no more than about 0.0067 inch (0.17 millimeter). If two ports are used, benefit is obtained so long as the port diameter is no more than 0.010 inch (0.25 millimeter). Where three or more ports are used, benefit is obtained so long as the port diameter is no more than about 0.017 inch (0.43 millimeter). As suggested by Examples 2, 12, and 24, preferred port diameters typically range from about 0.005 inch (0.13 millimeter), or smaller to about 0.010 inch (0.25 millimeter).

Cathode cans 20 of the invention can be made using a variety of metal structures. Important characteristics of the cathode can are obtained from ductility of the material used, and from chemical characteristics of the material at the opposing outer surface of the can. The can may be formed of virtually any metal that is plated, clad, or otherwise provided with an outer layer of the appropriate material. Such appropriate material, especially on the inner surface of the cathode can, has hydrogen overvoltage similar to that of the corresponding electrode and is insoluble at high aqueous pH's (or in the presence of alkaline electrolyte). The inner surface of the cathode can is in chemical communication via the electrolyte or electrolyte vapors with the electrode material, if not in direct physical contact therewith.

Optionally, can 20 may be formed entirely of a metal or alloy having a hydrogen overvoltage similar to that of the electrode (as opposed to plating or cladding the can). In addition to nickel, stainless steel, palladium, silver, platinum, and gold may be suitable plating, cladding, or can materials. Steel strip plated with nickel or nickel alloy is generally used because the cost is low, and because pre-plated steel strip, which generally requires no post-plating processes, is commercially available. The metal in the can must be ductile enough to withstand the drawing process, and strong enough to withstand the cell crimping and closure process.

Cathode cans, for example, may be made of cold-rolled steel plated with nickel. Steel strip pre-plated with nickel can also be used. Cathode cans may also be formed from cold-rolled mild steel, with at least the inside portions of the cans being subsequently post plated with nickel. Other specific examples of materials for cathode cans include nickel-clad stainless steel; nickel-plated stainless steel; INCONEL (INCO alloy of nickel, a non-magnetic alloy);

pure nickel with minor alloying elements (NICKEL 200 and related family of NICKEL 200 alloys such as NICKEL 201, etc.), all available from Huntington Alloys, a division of INCO, Huntington, W. Va.. Some noble metals may also find use as plating, cladding, or can metals, including steel strip plated with nickel, and mild steel strip subsequently plated with nickel after forming the can.

Cathode cans of the invention can be made using sheet material which is the conventional 0.008 inch (0.20 millimeter to 0.012 inch (0.30 millimeter) thick. Preferred sheet material thickness is less, for example about 0.0065 inch (0.17 millimeter) or less, down to about 0.004 inch (0.100 millimeter). However, as can forming technology and cell forming technology improve, to enable making the cathode can from thinner material, cathode cans of this invention can adopt use of such thinner material, with benefit.

In any event, where smaller ports are used, e.g. 0.005 inch (0.13 millimeter) diameter or less, and wherein the number of ports is increased, the diameter of a given port may be less than the thickness of the sheet material in which it is made. For example, where metal thickness is 0.0065 inch (0.17 millimeter) and port diameter is 0.005 inch (0.13 millimeter), the effective diameter of the port dimension is only about 75% as large as the effective dimension of the metal thickness. Where metal thickness is 0.0065 inch (0.17 millimeter) and port diameter is 0.003 inch (0.08 millimeter), the effective diameter of the port dimension is only about 50% as great as the dimension of the metal thickness. Typically, such small diameter/thickness relationships apply to all air ports in a given cell of the invention.

The reduced size ports of the invention, down to about 0.001 inch (0.025 millimeter) to about 0.003 inch (0.076 millimeter) can be made using a variety of known processes to work the metal, such as impact punch, punch and peen, water jet focused through sapphire, laser piercing, and the like.

The air ports smaller than 0.001 inch (0.025 mm) effective diameter are preferably made by a two-step mechanical process. The first step is fabricating a hole larger than the desired size for a given air port 34. The second step is to peen the metal around the hole, whereby the cold working of the metal causes the metal to flow and thereby reduce the size of the hole. Where conventional flat, namely blunt-ended, tools are used for the peening step, as illustrated generally in FIG. 9, the metal so worked can flow, within the metal sheet, in all directions from the force of the peening. Using such technique on otherwise conventional cathode can stock for zinc-air cells, the hole can be reduced in size to make an air port 34 having an effective diameter of about 0.001 inch (0.025 millimeter) to about 0.003 inch (0.076 millimeter).

Figure 11:
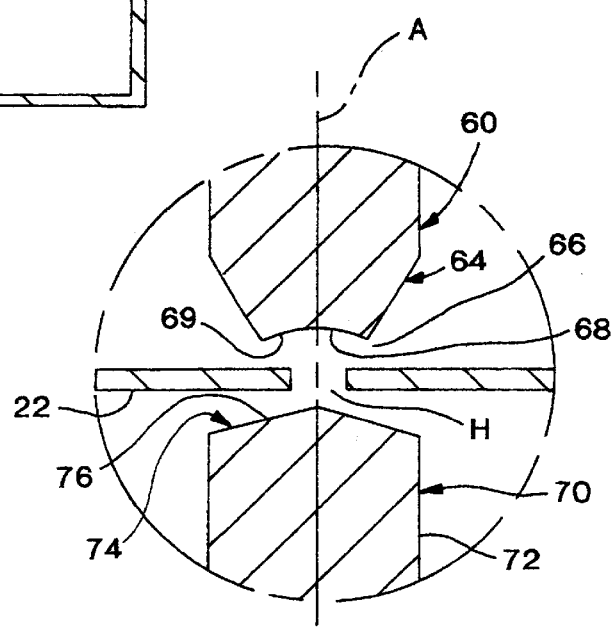
FIG. 11 is an enlarged view of the circled area marked as "11" in FIG. 10.
Figure 10:
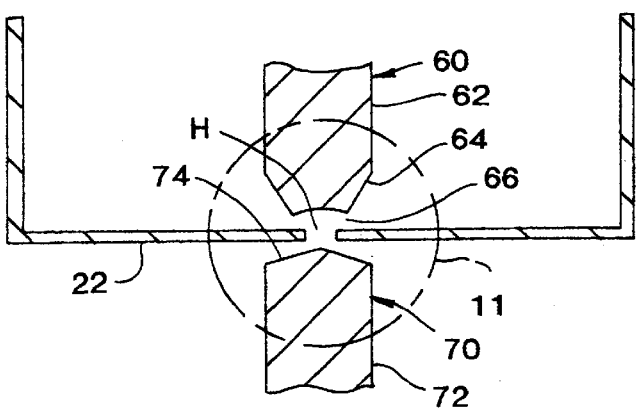
FIG. 10 is a side elevation, in cross-section, of a workpiece juxtaposed with novel restrained peening tooling of the invention.

A preferred restrained peening process for making ports, including air ports smaller than about 0.001 inch (0.025 millimeter) to about 0.003 inch (0.076 millimeter), is illustrated in FIGS. 10–14. Referring to FIGS. 10 and 11, cathode can 20 includes a hole "H" in bottom 22. Hole "H" in FIG. 11 represents a hole that is larger than the desired size for a finished air port 34 in the cathode can of the invention which is to be made therefrom. A pair of peening tools are illustrated properly supported above and below hole "H" in FIG. 11.

Figure 12:
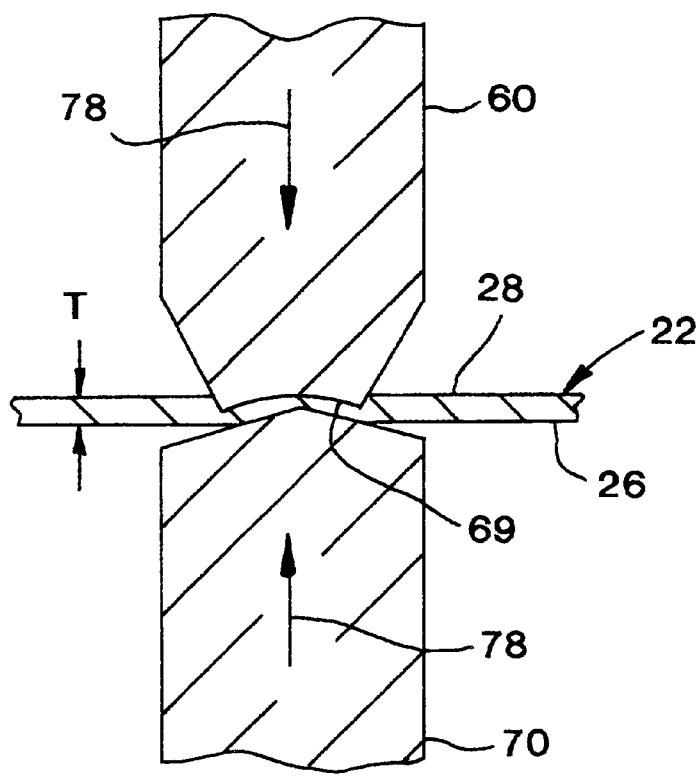
FIG. 12 is a side elevation as in FIG. 11, with the tooling activated and performing the peening operation.

Referring to FIGS. 10–12, upper peening tool 60 includes elongated shaft 62 and head 64. Head 64 tapers inwardly from its joinder with shaft 62 to a circular leading working edge 66. A shallow inverted cup 68 extends inwardly and upwardly in peening tool 60 from working edge 66, generally to central axis "A" of the tool. Inner surface 69 of cup 68 generally defines a surface arcuate in three dimensions, defining generally small angles with lines perpendicular to axis "A." Circular leading working edge 66 is centered on hole "H," and disposed outwardly of hole "H," such that a perpendicular projection of working edge 66 onto bottom 22 encircles hole "H," and defines an area about hole "H," including both the hole and metal surrounding the hole.

Lower peening tool 70 includes a second elongated shaft 72 and head 74. End surface 76 of head 74 tapers inwardly at a relatively shallow angle from lines perpendicular to axis "A," and more-or-less mirrors inner surface 69 of cup 68. Thus, when properly aligned, and with some deviation, inner surface 69 of upper peening tool 60 and outer surface 76 of lower peening tool 70 define a generally uniform distance between the surfaces. End surface 76, however, preferably defines a conical surface rather than the more speroidally-shaped inner surface 69. In any event, the exact natures of surfaces 69 and 76 are not critical so long as they cooperate with leading edge 66 in restraining the flow of metal within the circle defined by leading edge 66.

In operation, upper and lower peening tools 60, 70 are brought together as shown in FIG. 12, with a proper amount of force to work the metal around hole "H," as desired. As peening tools 60, 70 are brought together, circular working edge 66 engages the surface of the sheet metal, the sheet metal being concurrently supported by lower peening tool 70 from below. This engagement by circular leading edge 66 early in the working step, traps and holds in position a respective quantity of metal relative to leading edge 66. The trapped metal is disposed inwardly of the circular outline of leading edge 66, such that the trapped metal cannot flow outwardly of leading edge 66, or such outward flow is restricted or otherwise controlled.

As the metal working step continues, bringing peening tools 60, 70 closer together, as illustrated by both the spacing and arrows 78 in FIG. 12, leading edge 66 proceeds inwardly into the thickness "T" of the can bottom 22, forming an annular groove 80 in inner surface 28 of the can bottom.

As leading edge 66 penetrates further below surface 28, more and more of inner surface 69 comes into engagement with surface 28, as surface 76 of lower peening tool 70 concurrently engages outer surface 26 of can bottom 22. The metal deformation thus effected by leading edge 66, inner surface 69, and outer surface 76, results in the forming of circular trough 80 and a conically shaped transition element 82 between trough 80 and the newly reconfigured air port 34.

Surfaces 69 and 76 thus control flow of the metal disposed inwardly of the circle defined by leading edge 66, and directly urge and force the metal to flow in an inward direction toward hole "H." This inwardly controlled flow of metal toward hole "H" pushes inwardly the boundaries of hole "H," thereby reducing the size of hole "H" to the desired size, whereby the oversize hole "H" is converted to the correctly-sized air port 34. Preferred tooling, especially upper peening tool 60, preferentially urges metal inwardly toward the hole, to a greater extent than metal is urged outward, away from the hole.

Where sufficient force is used on peening tools 60, 70, and where the surfaces 69 and 76 are brought sufficiently close together, hole "H" can be completely reclosed. However, in preferred embodiments, the closest spacing of surfaces 69, 76 in working the hole "H" is not so close as to reclose hole "H," whereby hole "H" is reduced in size, but not closed, and a properly sized air port is formed by such working of the material around the larger size hole/air port. With the flow-controlled, restrained peening process completed, peening tools 60, 70 are withdrawn, leaving the reduced-size air port 34. By this restrained peening process, air ports can be made having any effective diameter of, for example, 0.00075 inch (0.019 mm), 0.0005 inch (0.013 mm), or 0.0002 inch (0.005 mm).

The resulting air port 34 is surrounded by circular trough 80 on the side of bottom 22 which corresponds to upper peening tool 60. Trough 80 increases in depth outwardly of air port 34 to a maximum depth corresponding with the locus of the metal fabricated at leading edge 66. Air port 34 is surrounded on the opposing side of bottom 22 by the bottom surface of transition element 82, beginning in the illustrated exemplary embodiment approximately across the thickness of bottom 22 from the locus of maximum depth of trough 80, and having a maximum depth at air port 34. Trough 80, and the bottom surface of transition element 82, illustrate residual shapes in the surfaces of bottom 22 resulting from the particular tooling illustrated in restrained peening of hole "H" in fabricating air port 34.

The metal between trough 80 and air port 34 has been thinned in the restrained peening process to a fraction of its earlier thickness. Typical thickness is between about 25% and about 60% of the thickness of the metal before peening. Thicknesses are possible outside the instantly above recited range, dependent on the specific mechanical conditions under which the peening is practiced and the properties desired for the finished air port 34.

The extremely small air ports of the invention are accompanied by correspondingly small ratios of effective diameter "Da" of the air port to the diameter of the cathode can, as illustrated in Table 5.

TABLE 5

| Cathode Can | Air Port Diameter | | | |
|---|---|---|---|---|
| Diameter | .001 | .00075 | .0005 | 0002 |
| .228 | .0044/1 | .0033/1 | .0022/1 | .00088/1 |
| .311 | .0032/1 | .0024/1 | .0016/1 | .00064/1 |
| .457 | .0022/1 | .0017/1 | .0011/1 | .00044/1 |

Thus, the ratio can be, for example, less than 0.004/1, less than 0.003/1, and exemplary less than 0.002/1.

The extremely small air ports of the invention are also accompanied by correspondingly small ratios of area of the air port to area of the bottom of the cathode can. Such ratio is calculated as $\pi(R_p)^2/\pi(R_c)^2$ where $R_p$=radius of the air port Rc=radius of the bottom of the cathode can.

Table 6 shows respective ratios represented by individual air ports at the respective diameters of air ports.

TABLE 6

| RATIO AIR PORT AREA TO CATHODE CAN BOTTOM AREA | | | | |
|---|---|---|---|---|
| Diameter | .001 | .00075 | .0005 | 0002 |
| .228 | $1.9 \times 10^{-5}$ | $1.1 \times 10^{-5}$ | $4.8 \times 10^{-6}$ | $7.7 \times 10^{-7}$ |
| .311 | $1.0 \times 10^{-5}$ | $5.8 \times 10^{-6}$ | $2.6 \times 10^{-6}$ | $4.1 \times 10^{-7}$ |
| .457 | $4.8 \times 10^{-6}$ | $2.7 \times 10^{-6}$ | $1.2 \times 10^{-6}$ | $1.9 \times 10^{-7}$ |

In preferred embodiments, the ratio of the area of the air port to the area of the bottom of the cathode can is no greater than $1.8 \times 10^{-5}/1$, preferably no greater than $3.9 \times 10^{-6}/1$, more preferably no greater than $3 \times 10^{-6}/1$. One preferred range is from about $3.8 \times 10^{-7}$ to about $3.5 \times 10^{-6}$.

While the invention has been described in terms of making air ports in cathode cans to be used in metal-air electrochemical cells, the above described methods can be used for a wide variety of applications where small size holes or ports are desired in metal. Accordingly, the method disclosed is generally operable with, and thus applicable to, all such processes, and is contemplated for use therein.

An affect of the above described restrained peening process is that the air port resulting from especially the second, restrained peening, step of such process usually has a non-circular cross-section whereby the area of the opening defined by the air port is more appropriately defined in terms of the area of a corresponding or effective diameter.

While the tooling has been described such that the leading edge 66 is circular, and the tooling in general is circular about axis "A" extending through shafts 62, 72, other shapes can now be designed in view of the disclosed principle of trapping or otherwise restraining a quantity of the metal for movement toward hole "H." Similarly, tool assemblies such as that disclosed can be fabricated with multiple respective upper and lower peening tools, thereby for simultaneously "restraint peening" the desired number of holes in bottom 22 of a cathode can 20.

As used herein, including in the following claims, "effective diameter" refers to the diameter which has an area corresponding to the area of the hole or air port of interest.

Using especially the reverse peening technology of the invention, and as suggested by the drawings, the effective diameter of air port 34 can be smaller than the thickness of bottom 22. Indeed, since hole "H" can be effectively closed by the reverse peening process, it is also possible that air port 34 be made to have an effective diameter smaller than the thickness of the thinned metal at transition element 82.

Figure 14:
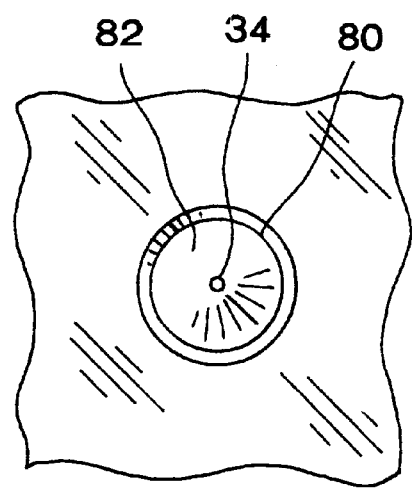
FIG. 14 shows a top view of the peened workpiece, and is taken at 14—14 of FIG. 13.
Figure 13:
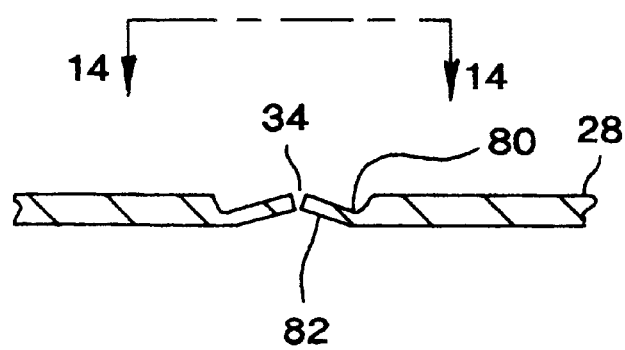
FIG. 13 shows a cross section of the peened workpiece.

FIG. 14 shows an enlarged top view of the restraint peened workpiece of FIG. 13, especially inwardly of trough 80.

Figure 15:
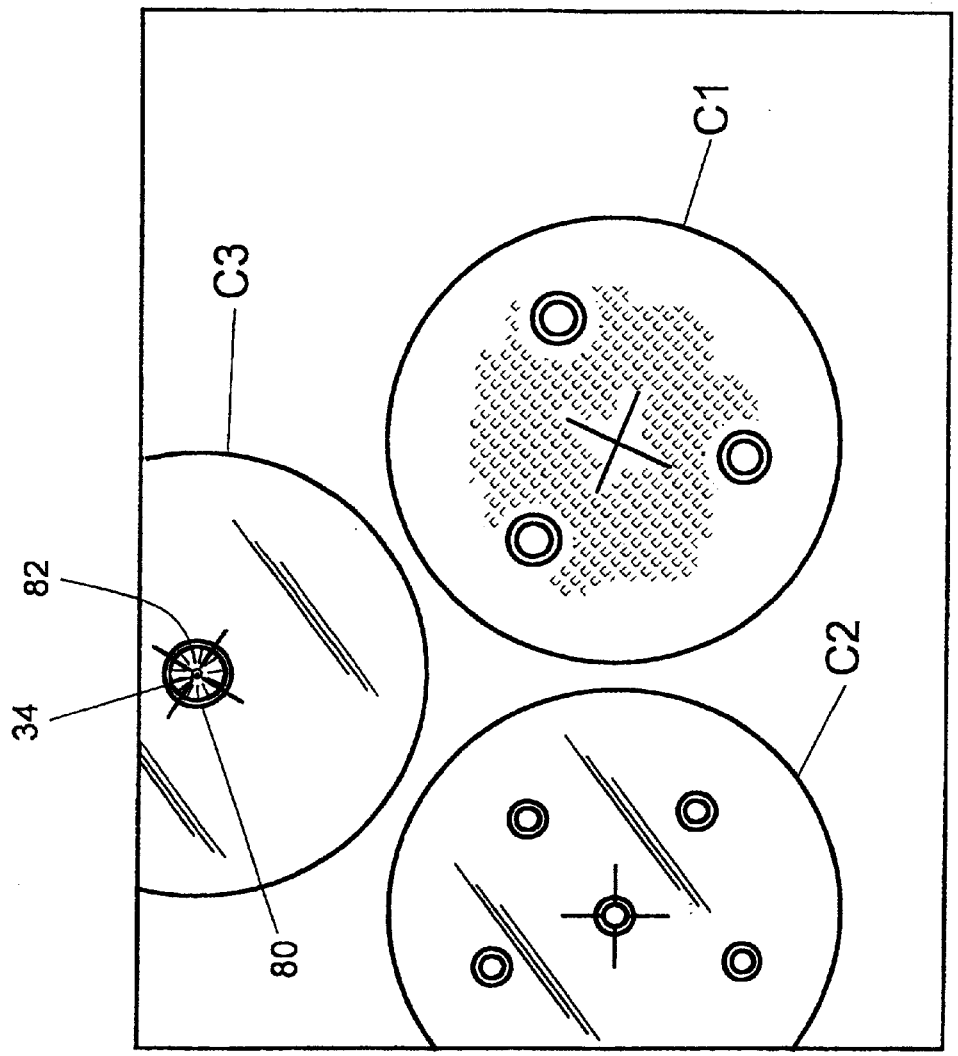
FIG. 15 shows, in a single photograph, comparative representations of air ports of the invention in cathode cans of the invention, and air ports not of the invention in cathode cans not of the invention.

FIG. 15 is an enlarged representation of a cropped photograph showing the outer surfaces of bottoms 22 of three cathode cans of size PR44, having outer diameters of about 0.45 inch (11.4 millimeter). The first cathode can "C1" is a prior art cathode can having three air ports having diameters of about 0.020 inch (0.51 millimeter) each, made with conventional mechanical punching technology.

Figure 9:
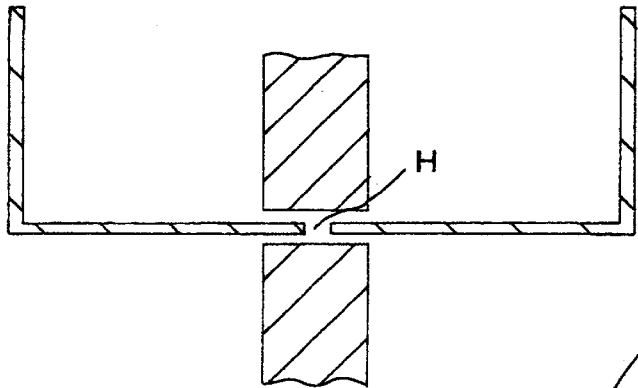
FIG. 9 is a side elevation, in cross-section, of a workpiece juxtaposed with blunt ended peening tools for peening the workpiece in making cathode cans of the invention.

The second cathode can "C2," shown only in part, has a total of six air ports having diameters of about 0.010 inch (0.25 millimeter) each made with mechanical punching technology, including peening as illustrated in FIG. 9.

The third cathode can "C3," also shown only in part, has a single air port 34 for illustration, having a diameter of about 0.003 inch (0.08 millimeter), made according to restrained peening technology of the invention. Trough 80 and transition element 82 are clearly visible on cathode can "C3."

In general, can "C3" was made according to the technology described with respect to FIG. 10, except that the positions of the upper and lower peening tools 60 and 70 were reversed (relative to FIG. 10) in making can "C3." Thus, the combination of FIGS. 10 and 15 illustrates that peening tools 60 and 70 can respectively be used against either arrangement of opposing surfaces of the can bottom, so long as they work cooperatively together to make a restraint peened configuration as illustrated, and wherein trough 80, and respectively tool 60 which directly forms trough 80, may be on either the inside of the cathode can or the outside of the cathode can.

FIG. 15 thus illustrates by direct visual comparison, and at significant magnification, the differences in relative sizes of air ports of the prior art (can "C1") and air ports of the invention (cans "C2" and "C3"). The fact that the actual diameters of the cells illustrated is 0.45 inch (11.4 mm), and the required magnification represented by FIG. 15 in order to be able to see the air port in can "C3," suggest the difficulty of fabricating such a small air port, and the inventive advance represented thereby. The 0.003 inch (0.08 mm) air port illustrated at can "C3" is, of course, only representative, and not limiting, of the invention. Smaller such air ports can be made, but reproducing photographs of such smaller air ports such that the air ports would be visible would be respectively more difficult. Rather, the 0.003 inch (0.08 mm) air port 34 of can "C3" is instructive regarding the nature of the invention, and not its limits.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. A cathode can, comprising:
   (a) a bottom, having an inner surface and an outer surface;
   (b) a side wall extending upwardly from said bottom; and
   (c) at least two air ports extending through said bottom, between said inner surface and said outer surface,
   said cathode can having an outside diameter, each said air port defining an open area thereacross corresponding to an effective diameter of the respective said air port, the ratio of the average of the effective diameters of the air ports to the outside diameter of said cathode can being no greater than 0.004/1.

2. A cathode can as in claim 1, the ratio of the average of the effective diameters of the air ports to the outside diameter of said cathode can being no greater than 0.003/1.

3. A cathode can as in claim 1, the ratio of the average of the effective diameters of the air ports to the outside diameter of said cathode can being no greater than 0.002/1.

4. A cathode can as in claim 1, said side wall defining an outer circumference of said cathode can, and an overall projected area of said cathode can enclosed within the outer circumference, each said air port defining an open area enclosed thereby, the ratio of the average of the areas of the air ports to the projected area of said cathode can, as defined by the outside diameter of said cathode can, being no greater than $1.8 \times 10^{-5}/1$.

5. A cathode can as in claim 1, said side wall defining an outer circumference of said cathode can, and an overall projected area of said cathode can enclosed within the outer circumference, each said air port defining an open cross-sectional area enclosed thereby, the ratio of the average of the cross-sectional areas of the ports to the projected area of the cathode can, as defined by the outside diameter of said cathode can, being no greater than $3.9 \times 10^{-6}/1$.

6. A cathode can as in claim 1, each said air port defining an opening thereacross corresponding to an effective diameter of less than 0.003 inch.

7. A cathode can as in claim 1, each said air port defining an opening thereacross corresponding to an effective diameter of less than 0.001 inch.

8. A cathode can as in claim 1, each said air port defining an opening thereacross corresponding to an effective diameter of no greater than about 0.00075 inch.

9. A cathode can as in claim 1, including a tool impression in said bottom of said cathode can, from a tool used to move material toward at least one of said at least five air ports, to thereby reduce the size of the respective air port, the tool impression extending about, and being spaced from the respective air port.

10. A cathode can as in claim 1, including at least five air ports extending through said bottom, between said inner surface and said outer surface.

11. A metal-air electrochemical cell made with a cathode can as in claim 1, said electrochemical cell including a cathode assembly in said cathode can, said cathode assembly having a reaction surface facing said bottom, said reaction surface defining an effective reaction area thereon, the ratio of the limiting current of said electrochemical cell in milliamps, to the effective reaction area of the reaction surface in millimeters squared being at least 100/1.

12. A metal-air electrochemical cell made with a cathode can as in claim 1, said electrochemical cell including a cathode assembly in said cathode can, said cathode assembly having a reaction surface facing said bottom, said reaction surface defining an effective reaction area thereon, the ratio of the limiting current of said electrochemical cell in milliamps, to the effective reaction area of the reaction surface in millimeters squared being at least 125/1.

13. A metal-air electrochemical cell made with a cathode can as in claim 1, said electrochemical cell including a cathode assembly in said cathode can, said cathode assembly having a reaction surface facing said bottom, said reaction surface defining an effective reaction area thereon, the ratio of the limiting current of said electrochemical cell in milliamps, to the effective reaction area of the reaction surface in millimeters squared being at least 150/1.

14. A metal-air electrochemical cell made with a cathode can as in claim 1, said electrochemical cell including a cathode assembly in said cathode can, said cathode assembly having a reaction surface facing said bottom, said reaction surface defining an effective reaction area thereon, the ratio of the limiting current of said electrochemical cell in milliamps, to the effective reaction area of the reaction surface in millimeters squared being at least 220/1.

15. A metal-air electrochemical cell made with a cathode can as in claim 3, said electrochemical cell including a cathode assembly in said cathode can, said cathode assembly having a reaction surface facing said bottom, said reaction surface defining an effective reaction area thereon, the ratio of the limiting current of said electrochemical cell in milliamps, to the effective reaction area of the reaction surface in millimeters squared being at least 100/1.

16. A metal-air electrochemical cell made with a cathode can as in claim 3, said electrochemical cell including a cathode assembly in said cathode can, said cathode assembly having a reaction surface facing said bottom, said reaction surface defining an effective reaction area thereon, the ratio of the limiting current of said electrochemical cell in milliamps, to the effective reaction area of the reaction surface in millimeters squared being at least 125/1.

17. A metal-air electrochemical cell made with a cathode can as in claim 3, said electrochemical cell including a cathode assembly in said cathode can, said cathode assembly having a reaction surface facing said bottom, said reaction surface defining an effective reaction area thereon, the ratio of the limiting current of said electrochemical cell in milliamps, to the effective reaction area of the reaction surface in millimeters squared being at least 150/1.

18. A metal-air electrochemical cell made with a cathode can as in claim 3, said electrochemical cell including a cathode assembly in said cathode can, said cathode assembly having a reaction surface facing said bottom, said reaction surface defining an effective reaction area thereon, the ratio of the limiting current of said electrochemical cell in milliamps, to the effective reaction area of the reaction surface in millimeters squared being at least 220/1.

19. A metal-air electrochemical cell as in claim 11, said electrochemical cell having a limiting current at initial start-up of at least 7.5 milliamps.

20. A metal-air electrochemical cell as in claim 15, said electrochemical cell having a limiting current at initial start-up of at least 7.5 milliamps.

21. A metal-air electrochemical cell made with a cathode can of claim 1.

22. A metal-air electrochemical cell made with a cathode can of claim 2.

23. A metal-air electrochemical cell made with a cathode can of claim 4.

24. A metal-air electrochemical cell made with a cathode can of claim 5.

25. A metal-air electrochemical cell made with a cathode can of claim 8.

26. A metal-air electrochemical cell made with a cathode can of claim 9.

27. A metal-air electrochemical cell made with a cathode can of claim 15.

28. A cathode can, comprising:
  (a) a bottom, having an inner surface and an outer surface;
  (b) a side wall extending upwardly from said bottom and defining an outer circumference of said cathode can, and an overall projected area of said cathode can enclosed within the outer circumference; and
  (c) at least two ports extending through said bottom, each said port defining an open cross-sectional area enclosed thereby, the ratio of the average of the cross-sectional areas of said ports to the overall projected area of said cathode can being no greater than $1.8 \times 10^{-5}/1$.

29. A cathode can as in claim 28, the ratio of the average of the areas of said ports to the overall projected area of said cathode can being no greater than $3.9 \times 10^{-6}/1$.

30. A cathode can as in claim 28, the ratio of the average of the areas of said ports to the overall projected area of the cathode can being less than $3 \times 10^{-6}$.

31. A cathode can as in claim 28, the ratio of the average of the areas of said ports to the overall projected area of the cathode can being from about $3.8 \times 10^{-7}$ to about $3.5 \times 10^{-6}$.

32. A cathode can as in claim 28, each said air port defining an open area thereacross corresponding to an effective diameter, the average of the effective diameters of said air ports being greater than zero up to less than 0.001 inch.

33. A cathode can as in claim 32, the average of the effective diameters of said air ports being no greater than 0.0005 inch.

34. A cathode can as in claim 28, said cathode can having an outside diameter, each said air port defining an open area thereacross corresponding to an effective diameter, the ratio of the average of the effective diameters of the air ports, to the outside diameter of said cathode can being no greater than 0.004/1.

35. A cathode can as in claim 28, said cathode can having an outside diameter, each said air port defining an open area thereacross corresponding to an effective diameter, the ratio of the average of the effective diameters of the air ports, to the outside diameter of said cathode can being no greater than 0.003/1.

36. A cathode can as in claim 28, said cathode can having an outside diameter, each said air port defining an open area thereacross corresponding to an effective diameter, the ratio of the average of the effective diameters of the air ports, to the outside diameter of said cathode can being no greater than about 0.002/1.

37. A cathode can as in claim 28, including a tool impression in said bottom of said cathode can, from a tool used to move material toward at least one of said at least two air ports, to thereby reduce the size of the respective air port, the tool impression extending about, and being spaced from, the respective air port.

38. A metal-air electrochemical cell made with a cathode can as in claim 28, said electrochemical cell including a cathode assembly in said cathode can, said cathode assembly having a reaction surface facing said bottom, said reaction surface defining an effective reaction area thereon, the ratio of the limiting current of said electrochemical cell in milliamps, to the effective reaction area of the reaction surface in millimeters squared being at least 100/1.

39. A metal-air electrochemical cell made with a cathode can as in claim 28, said electrochemical cell including a cathode assembly in said cathode can, said cathode assembly having a reaction surface facing said bottom, said reaction surface defining an effective reaction area thereon, the ratio of the limiting current of said electrochemical cell in milliamps, to the effective reaction area of the reaction surface in millimeters squared being at least 220/1.

40. A metal-air electrochemical cell made with a cathode can of claim 28.

41. A metal-air electrochemical cell made with a cathode can of claim 29.

42. A metal-air electrochemical cell made with a cathode can of claim 30.

43. A metal-air electrochemical cell made with a cathode can of claim 31.

44. A metal-air electrochemical cell made with a cathode can of claim 35.

45. A metal-air electrochemical cell made with a cathode can of claim 36.

46. A metal-air electrochemical cell made with a cathode can of claim 37.

* * * * *